United States Patent Office 3,423,703
Patented Jan. 21, 1969

3,423,703
DEVICE WITH MANY STABLE STATES OF EQUILIBRIUM
Vitaly Petrovich Sigorsky, Alexandr Artemjevich Molchanov, Leonid Semenovich Sitnikov, and Lev Lazarevich Utjakov, Novosibirsk, U.S.S.R., assignors to Institute Matematiki SOAN U.S.S.R.
Filed May 13, 1964, Ser. No. 367,094
U.S. Cl. 334—15                  2 Claims
Int. Cl. H03j 3/06

ABSTRACT OF THE DISCLOSURE

A multistable device is employed which includes a parallel resonant circuit in which a capacitor and voltage controlled diode are connected in parallel with an inductor. A D.C. source is coupled by a switch to another capacitor which is alternately coupled to said source and to the capacitor in the resonant circuit.

---

The present invention relates to digital computer techniques and more particularly to methods for controlling multistable state devices.

There exist devices with many stable states of equilibrium such as flip-flops. However, there are other multistable state devices in which the number of active and passive elements does not depend upon the number of stable state devices in which the number of active and trons, synchrotrons, devices with Kerr cells and so forth. A typical spectrotron i.e. a device with many stable states of dynamic equilibrium differing in frequencies of harmonic oscillations, is fully described in our abandoned co-pending application Ser. No. 367,165, filed May 13, 1964.

The method of controlling a "spectrotron" incorporating a feedback and containing a controllable resonance system (supplied with an alternating voltage having the required linear spectrum) as well as a detector, a smoothing filter and an amplifier, which are series-connected to the resonance system, consists of momentarily opening the feedback circuit by shunting the capacitor of the resonance system of the spectrotron for the time required to discharge the capacitor by such an amount such that the frequency of the resonance system's tuned circuit corresponds to the frequency region of the next harmonic of the alternating voltage.

Furthermore, a spectrotron may be controlled by a momentary change of the alternating voltage source having the required linear spectrum by an auxiliary voltage, whose frequency spectrum components are located in the linear spectrum of the supply alternating voltage.

These methods are not advantageous because of either insufficient speed of action or because they demand critical parameters (amplitude, duration) of the trigger pulses.

An object of the present invention is the elimination of the above disadvantages and the creation of a universal method for controlling devices with many states of equilibrium, and further high-speed action or fast response of these devices and their reliability.

In accordance with this and other objects, the invention contemplates a new method for controlling devices with many states of equilibrium, wherein a trigger pulse connects an additional capacitor, previously charged from a D.C. source, to the filter capacitor.

Other objects and advantages of the invention will be readily understood from reference to the following description and the accompanying drawings, in which.

Figure 1:
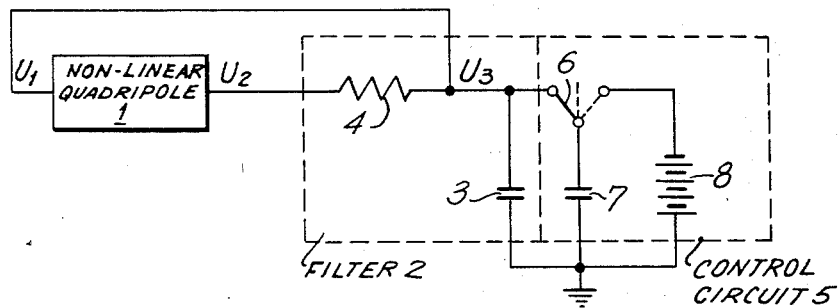
FIG. 1 is an elementary block diagram of a device with many states of equilibrium, controlled by a method in accordance with the invention.
Figure 2:
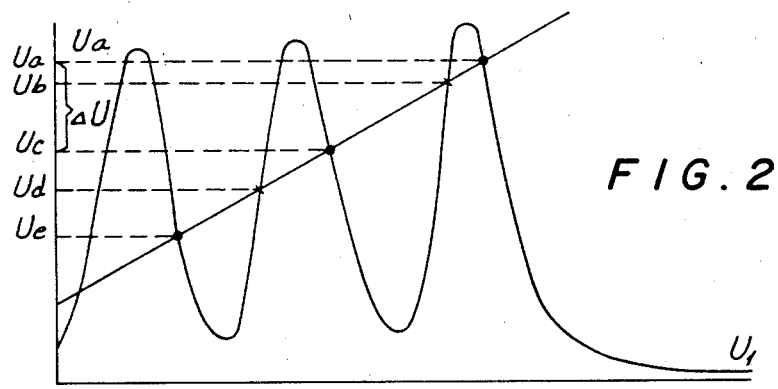
FIG. 2 is the amplitude characteristic of the device with an open feedback circuit when the feedback line is applied.

A multistable state device controlled in accordance with the invention includes, as shown in FIG. 1, a non-linear quadripole 1 (FIG. 1) having an amplitude characteristic according to FIG. 2; a filter 2 including a capacitor 3 and a resistor 4; and a control circuit 5 including a switch 6, a capacitor 7 and a D.C. voltage source 8.

A definite value of output voltage at the capacitor 3 of filter 2 corresponds to each stable state of the device.

If the device is in one of its stable states, the transient phenomena are absent and the equation $U_2 = U_3$ is satisfied, where $U_2$ is the voltage at the output of quadripole 1 and $U_3$ is the voltage at the output of the filter. At the moment the trigger pulse is applied, i.e., when switch 6 is connected to the capacitor 3 of filter 2 having a value of C, the additional capacitance of capacitor 7 having the value $\Delta C$, is added to the circuit. The circuit capacitance C is changed to a value $C' = C + \Delta C$. The redistribution of charges between capacitors 3 and 7 causes a sharp decrease of voltage $U_3$. The decreasing voltage of the capacitor 3 is applied to the input of non-linear quadripole 1 at the output of which it causes a voltage change depending upon the amplitude characteristic of the device. Since, upon completion of the trigger pulse operation, the output voltage in the general case may not be equal to the voltage across the capacitor 3 of the filter, a new stage of the transient begins, which ends in triggering the device into the nearest condition of equilibrium, in which $U_2 \cong U_3$.

To effect the changeover, it is necessary that under the action of the trigger pulse the device pass, in sequence, all the stable states. However, it can be shown that the above described method does not allow the successive shifting of the device from one condition to another in the case when the device is "linear" (a "linear" device is a device in which the difference of voltages $\Delta U$, corresponding to any pair of neighboring states of stable equilibrium, change by an insignificant amount). It is just such linear devices which are considered in the present patent application. It will next be shown how to determine the value of the change in voltage $\Delta U$ at the capacitor 3 of filter 2 when the trigger pulse acts upon the switch circuit.

Assuming that in some state "k" the voltage $U_3$ is equal to:

$$U_{(3k)} = \frac{q_{(k)}}{C}$$

where $q_{(k)}$ is the charge of filter capacitor, i.e.

$$q_{(k)} = U_{3(k)} \times C$$

After the additional capacitance $\Delta C$ of capacitor 7 is added to the capacitance of capacitor 3, voltage $U_{3(k)}$ assumes a new value, equal to:

$$U'_{3(k)} = \frac{q_{(k)}}{C + \Delta C}$$

Then $$\Delta U = U_{3(k)} - U'_{3(k)} = q_{(k)}\left(\frac{1}{C} - \frac{1}{C+\Delta C}\right) = U_{3(k)}\left(1 + \frac{C}{\Delta C}\right) \quad (1)$$

As seen from the last equation, with a constant value of the additional capacity, the change of voltage $\Delta U$ from one state to another occurs within wide limits (according to the hyperbolic law).

Meanwhile, the connecting of a previously charged capacitor having a capacitance of $\Delta C$ to the filter 2 makes it possible to considerably decrease the changes of voltage $\Delta U$ when passing from one state to another. If, in the stable state the charge on the filter capacitor is equal to $q$ and the charge on the additional capacitor is $\Delta q$, then, under the action of the trigger pulse the filter capacitance changes to the value $C'=C+\Delta C$, and the charge to $q'=q+\Delta q$.

It is apparent that to change voltage $U_a$ across the filter (FIG. 2) by value $\Delta U$ upon connecting the additional capacitance $\Delta C$ to the filter it is necessary that the following condition be satisfied:

$$\frac{q}{C} - \frac{q+\Delta q}{C+\Delta C} = \Delta U \qquad (2)$$

where $$\frac{q}{C} = U_a, \quad \frac{q+\Delta q}{C+\Delta C} = U_a - \Delta U = U_C$$

From Equation 2 there is determined the value $\Delta q$:

$$q = \frac{q\Delta C - C(C+\Delta C)\Delta U}{C} = q \times \frac{\Delta C}{C}$$

$$-\Delta U(C+\Delta C) = V_a \Delta C - \Delta V (C+\Delta C) \qquad (3)$$

To ensure a reliable changeover, it is necessary that for various states, the value $\Delta q$ change insignificantly. By analogy with Equation 3 the value of $\Delta q$, necessary for changing of filter voltage $U_C = U_a - \Delta U$ by value $\Delta U$, can now be determined:

$$\Delta q_1 = \frac{\Delta C}{C} \cdot q - \Delta U(C+\Delta C) = U_C \Delta C - \Delta U(C+\Delta C) \qquad (4)$$

Subtracting (4) from (3), there is obtained:

$$\Delta q - \Delta q_1 = (U_a - U_C)\Delta C = \frac{\Delta C}{C}(q-q_1) \qquad (5)$$

The smaller the difference $\Delta q - \Delta q_1$, the simpler is the changeover and its reliability. Let us examine the right-hand part of Equation 5 to evaluate value $\Delta q - \Delta q_1$. Considering that $q-q_1 = \text{const}$ (when $U_a - U_a = \text{const}$), it is seen that the value $\Delta q - q_1$ decreases with a decrease of ratio $\Delta C/C$, i.e. upon a decrease of $\Delta C$.

Thus, with a decrease of $\Delta C$ the absolute value of $\Delta q$ increases, but the difference $\Delta q - \Delta q_1$ tends to become zero. However, a limitless decrease of additional capacitance is impossible, because this leads to a voltage increase at the switch and, ultimately, to considerable complication thereof.

Summarizing the above, it may be concluded that with the given method of control the device with many stable states is not critical to pulse parameters, and the optimum selection of the value $\Delta C$ permits a reliable changeover, i.e. shift to another stable state. When determining the optimum magnitude of the value $\Delta C$, certain limitations, placed on $\Delta C$, should be taken into consideration.

Apparently, if the value $\Delta C$ is such, that the change in voltage $\Delta U$ determined from (1) is smaller than $U_a - U_b$, then, at the moment the trigger pulse operates, the voltage $U_2$ becomes larger than the voltage $U_3$ and, consequently, the filter capacitor begins charging and the device returns to state $U_a$. If the inequality $$U_a - U_b < \Delta U < U_a - U_c$$

is satisfied, then at the moment the trigger pulse operates the voltage $U_2$ becomes less than the voltage $U_3$, the filter capacitor discharges and the voltage decreases until the device passes into neighboring state $U_c$. When $$U_a - U_c < \Delta U < U_a - U_d$$

the device, first passes through state $U_C$, but will return to it.

Thus, the condition of triggering of the device from some state of equilibrium $U_a$ to neighboring state $U_C$ may be expressed as:

$$U_a - U_b < \Delta U < U_a - U_d$$

Figure 3:
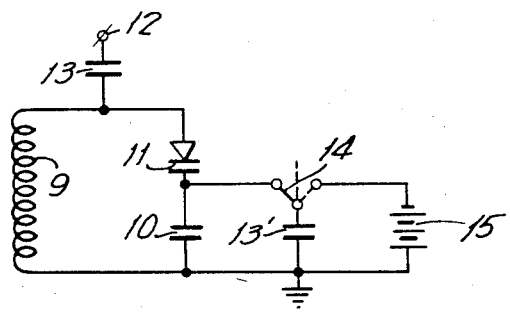
FIG. 3 is the schematic diagram of a "spectrotron" controlled by a method in accordance with the invention.

FIG. 3 shows the circuit of a "spectrotron" controlled by the proposed method.

The spectrotron represents an oscillatory circuit returned in frequency and containing inductance coil 9, capacitor 10 and controlled diode 11 a diode whose capacitance is a function of voltage. The oscillatory circuit is supplied via terminal 12 and capacitor 13 from a voltage source with a set linear spectrum (not shown). By means of switch 14 an additional capacitor 13 previously charged from D.C. source 15, is connected in parallel to capacitor 10 functioning as a filter, and thus the spectrotron is triggered.

Although the present invention has been described in connection with a preferred embodiment, it is understood that modifications may be made by those skilled in the art without departing from the idea and scope of the invention.

These modifications are considered to be within the spirit and scope of the invention as set forth in the appended claims.

What is claimed is:

1. In combination, a multi-stable state device comprising: a parallel resonant circuit including an inductor, a serially connected controlled diode and a first capacitor connected in parallel with said inductor, a second capacitor having one terminal connected to the junction of said controlled diode and said inductor and a second terminal, said second terminal being adapted to receive an alternating voltage having a given linear frequency spectrum; a third capacitor having a first terminal connected to the junction of said inductor and said first capacitor, and a second terminal; a source of direct current having a first terminal connected to the first terminal of said third capacitor and a second terminal; and switch means for alternately connecting the second terminal of said third capacitor between the second terminal of said source of direct current and the junction of said first capacitor and said controlled diode.

2. In combination, a multi-stable state device comprising: a parallel resonant circuit including an inductor, a serially connected controlled diode and a first capacitor connected in parallel with said inductor, a second capacitor having one terminal connected to the junction of said controlled diode and said inductor and a second terminal, said second terminal being adapted to receive an alternating voltage having a given linear frequency spectrum; and controllably switchable capacitor means momentarily connectable in parallel with said second capacitor including a third capacitor, a source of direct current, and switch means for alternately connecting said third capacitor to the junction between said first capacitor and said controlled diode and said source of direct current.

References Cited

UNITED STATES PATENTS

| 2,182,377 | 12/1939 | Guanella | 332—30 |
| 3,153,194 | 10/1964 | Orwin | 331—36 |
| 3,177,454 | 4/1965 | Dijkum | 331—177 |

TERRELL W. FEARS, *Primary Examiner.*

U.S. Cl. X.R.

307—320